United States Patent [19]

Jensen et al.

[11] Patent Number: 5,356,266
[45] Date of Patent: Oct. 18, 1994

[54] CENTRIFUGAL PUMP UNIT

[75] Inventors: Niels D. Jensen, Bjerringbro; Jørgen Daugbjerg, Ulstrup, both of Denmark

[73] Assignee: Grundfos a/s, Bjerringbro, Denmark

[21] Appl. No.: 17,089

[22] Filed: Feb. 12, 1993

[30] Foreign Application Priority Data

Feb. 14, 1992 [DE] Fed. Rep. of Germany ....... 4204323
May 9, 1992 [DE] Fed. Rep. of Germany ....... 4215266

[51] Int. Cl.$^5$ .............................................. F04B 49/06
[52] U.S. Cl. ...................................... 417/45; 318/778; 318/794
[58] Field of Search ........... 417/53, 45, 423.7, 423.14; 318/728, 778, 779, 794, 797

[56] References Cited

U.S. PATENT DOCUMENTS

| | | | |
|---|---|---|---|
| 3,633,082 | 1/1972 | Hasegawa | 318/212 |
| 3,761,792 | 9/1973 | Whitney et al. | 318/221 |
| 4,300,081 | 11/1981 | Van Landingham | 318/599 |
| 4,459,535 | 7/1984 | Schutten et al. | 318/808 |
| 4,516,915 | 5/1985 | Jensen et al. | 417/365 |
| 4,651,077 | 3/1987 | Woyski | 318/781 |
| 5,017,853 | 5/1991 | Chmiel | 318/794 |

FOREIGN PATENT DOCUMENTS

| | | |
|---|---|---|
| 0210524 | 2/1987 | European Pat. Off. . |
| 2047906 | 4/1971 | Fed. Rep. of Germany . |
| 3105444 | 7/1982 | Fed. Rep. of Germany . |
| 3210761 | 9/1983 | Fed. Rep. of Germany . |
| 462932 | 11/1968 | Switzerland . |
| 0738159 | 10/1955 | United Kingdom . |

OTHER PUBLICATIONS

Theodor Bödefeld et al., "Elektrische Maschinen," Springer-Verlag (1961), pp. 290–292.

Primary Examiner—Richard A. Bertsch
Assistant Examiner—M. Kocharov
Attorney, Agent, or Firm—Panitch Schwarze Jacobs & Nadel

[57] ABSTRACT

The centrifugal pump unit has a split tube motor in the form of a single phase induction motor with at least one power winding and a starting winding accommodated in a split tube casing. For the purpose of unblocking the rotor, a rectifier element is provided, which is able to be connected in parallel or in series with at least a part of a starter or power winding. The average torque produced by the motor when in its unjamming phase is always in the same direction, so that the pump will commence rotating in the correct direction when unjammed. The rectifier element may be connected in every time the pump unit is started, possibly for a predetermined time, or may alternatively be connected in only when jamming occurs.

14 Claims, 5 Drawing Sheets

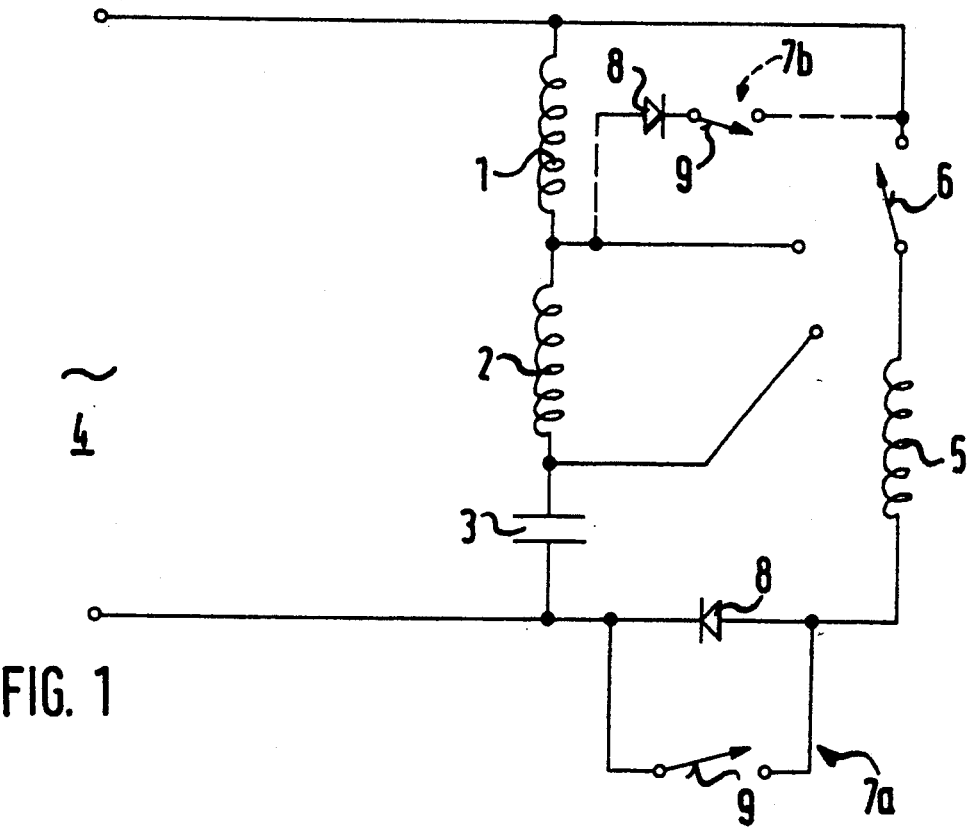
FIG. 1
FIG. 2
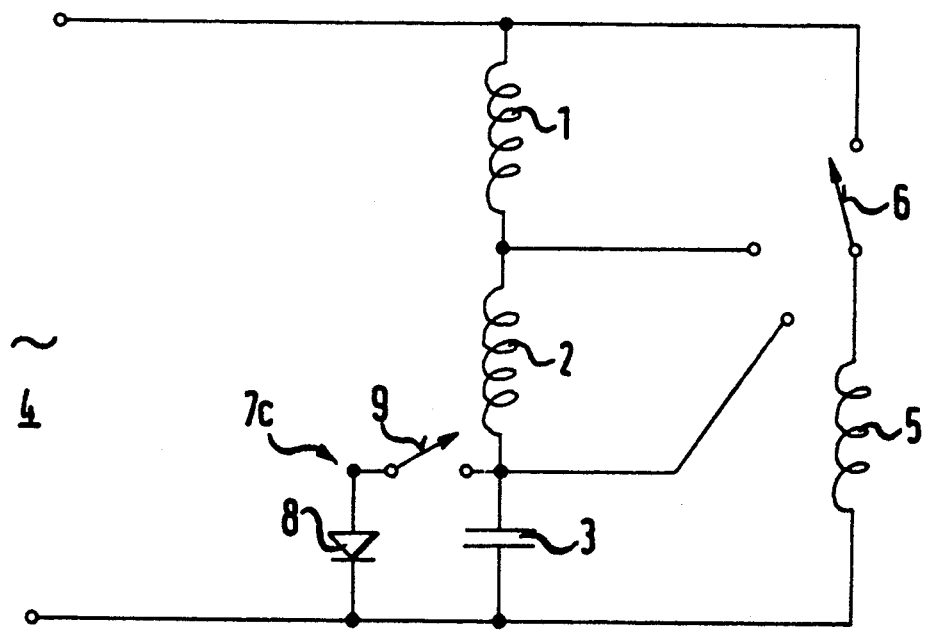

CENTRIFUGAL PUMP UNIT

TECHNICAL FIELD

The invention relates to a method for unjamming the rotor of a single-phase induction motor of a centrifugal pump unit and also to a centrifugal pump unit constructed accordingly.

BACKGROUND ART

Centrifugal pump units of this type, when they are equipped with wet-running motors, are predominantly used as circulating pumps in heating systems. As the generated power of the vast majority of these units is typically below 100 watt, the motors have a very small starting torque. Both in closed systems, such as heating installations for example, and also in open systems, contamination of the conveyed fluid can cause problems. The contamination can be in the form of particles of dirt, deposited particles of lime or other substances in suspension. If such particles reach the centrifugal pump unit, then as a rule this is still not a problem, as long as the unit is kept in operation. However, if the pump unit is brought to a standstill, then the particles situated inside the pump unit can easily lead to the clogging, i.e. jamming, of the rotor, so that when the unit is switched on again, the rotor is not able to rotate. The cause of this jamming of the rotor may be particulate solids borne by the conveyed flow or deposits (e.g. lime) on the rotor shaft. These particles or deposits may be drawn into the bearing gap through axial movement of the rotor brought about on switching off. Because bearing tolerances are nowadays kept as small as possible, for reasons of noise development, even minute particles can increase the friction moment inside the bearing to such an extent that the starting torque of the motor is not sufficient to set it in motion.

A typical pump of the type described above is known for example from DE 32 10 761 C1. In this publication, the above-mentioned problem is likewise described. To solve this problem, the pump unit described therein—like almost all pump units of this type—has an opening in the base of the split tube casing and also of the pump housing, which is able to be closed by means of a plug. Through this opening, the end of the rotor shaft of the motor is freely accessible after the plug is removed. Through this opening, a screw driver can be inserted into a groove on the end face of the rotor shaft, and turned to unjam the pump.

This manual unjamming generally leads to the desired result, but has the disadvantages that it is time-consuming, and should be carried out by specialist personnel. This leads to delay and increased costs.

However, even the specialist is possibly in danger during the activities described above for unjamming the pump. Through the removal of the plug, the customarily pressurized water-carrying system, is opened, so that it is possible that very hot water may emerge through the bearing gap under pressure into the environment.

A further disadvantage is the fact that in typical modern heating systems, three such pump units are integrated in one installation, which are switched on or off automatically through a regulating or controlling the installation. Here, the risk of blocking and breakdown of the entire installation is particularly great owing to the frequency of switching pumps on and off.

In addition, it is structurally disadvantageous to provide a closable opening, in the base of the split tube pump casing and also in alignment therewith in the motor housing. Additional processing stages and components (plug, seal etc.) are necessary. Also the required accessibility of the opening restricts the fitting position, which is a disadvantage, particularly in compact heating installations.

OBJECT OF THE INVENTION

Proceeding from this prior art, the invention is based on the problem of creating a method for unblocking the rotor, which avoids the above-mentioned disadvantages, in particular obviates the above-mentioned manual unjamming and can also be controlled externally or can be incorporated into automatic control or regulation processes. In addition, it is a further object of the invention to provide a single phase induction motor centrifugal pump unit constructed for the application of the inventive method.

SUMMARY OF THE INVENTION

The foregoing objects are met in accordance with the present invention by the provision of an electric motor of a pump unit which is electrically controlled so as to provide an increased torque and/or a torque which changes in direction, for unjamming the pump unit.

An increased torque to unjam the unit may advantageously be produced by at least a portion of the motor winding being acted upon by a voltage which alters over time, the mean value of which, formed during an oscillation period (of the supply voltage) is not equal to zero during unjamming of the pump unit. This may be achieved in a number of ways. For example the voltage supply may be interrupted over fractions of the oscillation period, the zero line of the supply voltage may be displaced or the mean value of the voltage may be altered in a different way. It is to be understood that according to the invention, the motor is controlled during the unjamming phase with a voltage the chronological mean value of which is controlled deliberately so as to be not equal to zero. The fluctuations which are usually present through irregularities within the supply network and which on close observation likewise lead to a mean voltage value not equal to zero, are negligible and are not sufficient for resulting variation of the torque generated by the motor to achieve the specific objectives of the invention.

A preferred solution for the control of the electric motor consists in supplying to at least a part of a motor winding an alternating current, the negative or positive half waves of which are filtered out or otherwise suppressed for a time. This may take place for example by connecting a rectifier element into a winding or a portion of a winding. This rectifier element is actively connected for the purpose of unjamming. This may take place for a predetermined time each time the unit is switched on or else through a separate switch position or control. It is to be understood that this method can be readily integrated into fully automatic sequence controls, in which sensors may be necessary to determine the operating status of the pump.

The method according to the invention therefore makes possible an unjamming of the pump unit without external intervention. Structurally, this has the advantage that openings in the split tube casing and in the end wall of the housing with an associated closure plug etc., which have hitherto been regularly provided, can be dispensed with entirely.

The above problem relating to the device may be solved according to the invention in that a rectifier element is associated with the centrifugal pump unit, which rectifier unit is able to be connected for a time in parallel or in series with at least a portion of a winding of the pump unit's motor. In such a switching arrangement, it has been surprisingly found that on connecting in the rectifier element, (for example a diode), the motor produces a starting torque which is typically more than twice as great as the usual starting torque. This torque does not, however, remain constant as in the prior art, but alters periodically, and with the frequency of the energy source which is supplied to the motor. Here, not only its extent alters, but also its direction of rotation. If, for example, a centrifugal pump unit is operated without a frequency rectifier, with the customary line frequency of 50 Hz, then this starting torque also alters with the line frequency, according to the arrangement of the rectifier element, but out-of-phase. In the above arrangement employing a rectifier element according to the invention, the direction of rotation alters periodically, and the mean torque moment remains positive, so that the rotor not only vibrates, but also in fact starts in the intended direction of rotation. Through the solution according to the invention, therefore, an increased starting torque is brought about, in combination with a vibrating effect and a rotor moving in the intended direction of rotation, which is particularly favourable for unjamming.

This effect of the invention (vibrating effect with simultaneous turning of the rotor) can be used not only for unjamming the pump, but also to determine the operating state of the pump (i.e. turning or standstill). This is a very useful aspect in practice. If during the operation of the unit this switching arrangement is activated, then if the rotor is already running, only a slight vibration will be noticeable. However, if the pump rotor is jammed, the pump unit vibrates considerably more violently. Therefore, the operating state can be readily monitored by monitoring this vibration without further auxiliary means being necessary. This monitoring possibility is especially important for heating technology, because the present-day circulating pumps operate with such a small amount of vibration and so quietly that it is frequently only possible to establish with difficulty whether the unit is running or if it has stopped.

In the simplest form, a diode may be used as the rectifier element. Diodes are cheaply available and can be activated for example via a step switch which is customarily present in such pump units.

It is known in the case of higher capacity centrifugal pump units driven by three-phase motors, to connect in series a rectifier element with a winding. This solution is, however, not comparable with the solution according to the invention. Such an arrangement serves solely to control the rotational speed of the pump and in particular to reduce the rotational speed.

The present invention can be realised with simple means not only in new structures, but also in existing centrifugal pump units, by a rectifier element and a switching arrangement being subsequently integrated for example in the connection box or by being attached thereon in a separate housing. Also, a subsequent incorporation at a different site is possible, for example through interposition of a correspondingly equipped apparatus into the supply line of the pump unit.

In particular in modern, frequency controlled centrifugal pump units, it proves to be advantageous to actively connect with a switching arrangement, not only the rectifier element to introduce the unjamming phase, but also simultaneously, means to control the frequency controller to provide a particularly favourable frequency for this unblocking.

DESCRIPTION OF THE DRAWINGS

Other objects and advantages of the invention will be apparent from the following description taken in conjunction with the accompanying drawings wherein:

FIG. 1 shows a circuit diagram of a single-phase induction motor of a centrifugal pump unit with an unjamming arrangement, FIG. 2 shows a different embodiment of the circuit according to FIG. 1, FIG. 5 shows the relative magnetic flux of the rotor and stator during a rotation of the rotor in a centrifugal pump unit without an activated unjamming arrangement and FIG. 6 shows the relative magnetic flux of the stator during a revolution of the rotor with and without the unjamming arrangement being connected in.

DETAILED DESCRIPTION

Figure 3:
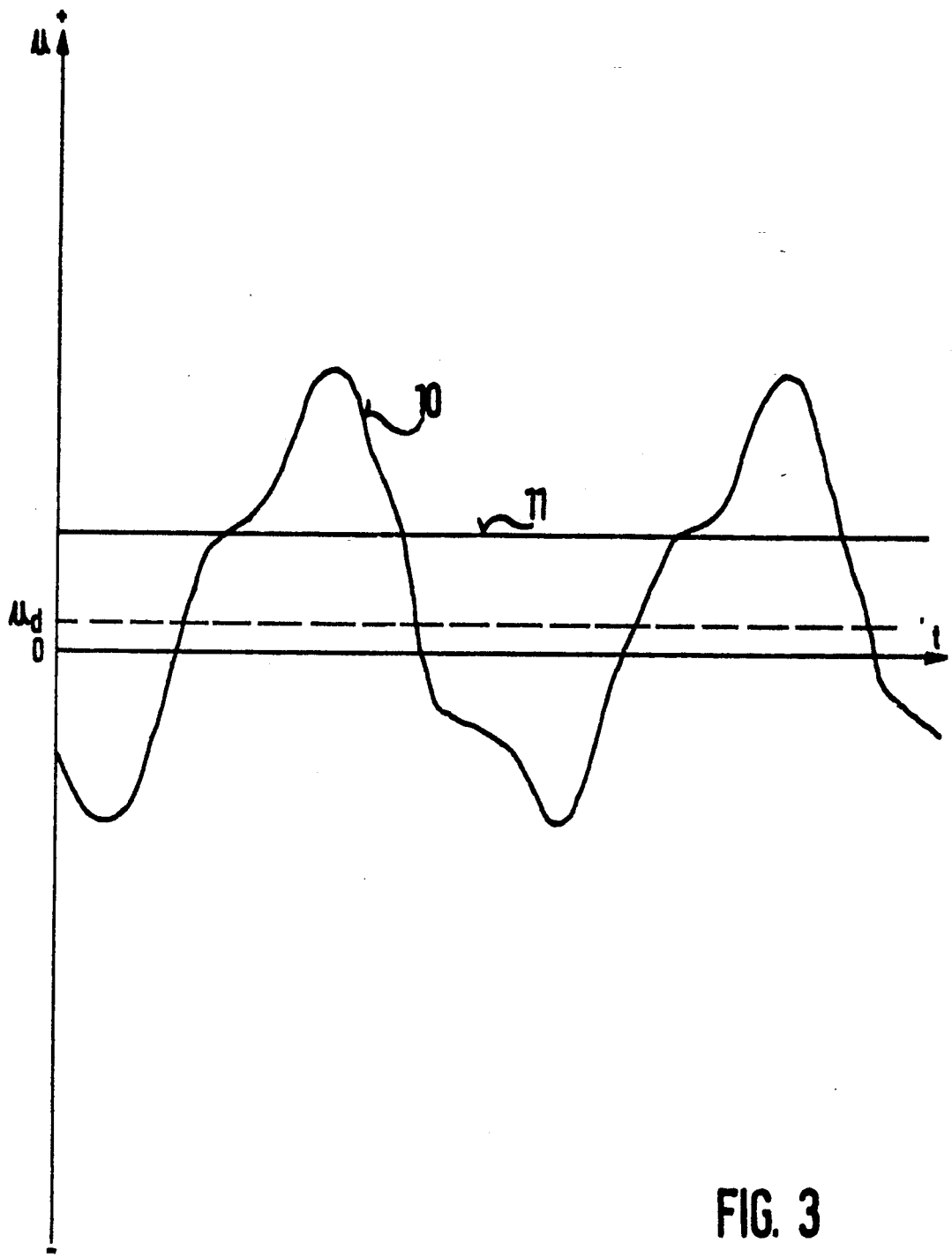
FIG. 3 shows the variation of the torque of the rotor shaft against time during the unjamming phase.

FIG. 1 illustrates the circuit diagram of a single phase induction motor of a centrifugal pump unit with an unjamming arrangement. The motor has a starting winding consisting of two winding parts 1 and 2, which are connected in series with a condenser 3 across the mains supply 4 of particular frequency and voltage. However, the frequency may also be able to be altered by a frequency changer connected in series.

In addition, the electric motor has a power winding 5, which is connected in a known manner in parallel to the starting winding 1,2 and is likewise connected across the mains supply 4. Through the condenser 3, the starting winding 1,2 operates out-of-phase with respect to the power winding 5.

As can be seen from FIG. 1, the power winding 5 may be connected via a step switch 6 either parallel to the starting winding 1,2, parallel to the winding part 2 of the starting winding or parallel to the condenser 3. These switching combinations are known per se and are usual in the field of the centrifugal pump units under discussion here, in order to be able to drive the pump with a differing output in a simple and favourably priced manner.

The arrangement described in the introduction, for unjamming the jammed rotor, is marked in the circuit diagram by 7a or alternatively (illustrated in broken lines) by 7b. This arrangement consists of a rectifier element 8a or 8b in the form of a diode and also consists of a switch 9a or 9b, with which this diode is actively connected to introduce the unjamming phase.

In the unjamming arrangement 7a, the diode is connected in series with the power winding 5. In the illustrated switch position, the diode 8a is active, i.e. it suppresses a half wave of the alternating current flowing through the power winding 5. By closing the switch 9a, the unjamming arrangement 7a is disconnected, by bridging the diode 8a.

An alternative embodiment of the arrangement for unjamming is designated by 7b. There, the diode 8b is connected in parallel to the winding part 1 of the starting winding 1,2. In the illustrated position, the arrangement is not active. Only on closing the switch 9b is the diode 8b connected parallel to the winding part 1, so that a half wave of the alternating current, flowing through this winding part 1, is suppressed through short-circuiting, via the diode 8b.

In the circuit diagram illustrated in FIG. 2, a further alternative arrangement of the unjamming arrangement characterised therein by 7c is shown. As can be seen from this circuit diagram which, as regards the actual motor, coincides with that according to FIG. 1, the diode 8c is able to be connected via the switch 9c parallel to the condenser 3, whereby the unblocking arrangement 7c is activated. In the illustrated switch position it is inactive. Experiments have shown that with a switching arrangement according to FIG. 2, in which the diode 8c is able to be connected parallel to the condenser 3, particularly good results are achieved with unjamming.

All the arrangements 7 have in common the fact that when they are activated, a moment pattern is produced on the rotor, as illustrated diagrammatically in FIG. 3 by the curve 10. For comparison, a curve 11 is drawn in FIG. 3, which shows the starting moment of the same motor without an arrangement for unblocking or respectively without activation of this circuit. The comparison of the curves 10 and 11 makes it clear that through the circuit according to the invention, a starting torque of the rotor is achieved with peak values which are more than twice as great as the conventional starting torque of the motor and which, in addition, alter their direction periodically. The frequency of the reversal of direction corresponds to the mains frequency, or alternatively the starting frequency of the supplying frequency converter. Depending on the type of the unjamming arrangement used, the moment curve deviates in the unjamming phase from the sine shape (here in greatly simplified representation) both in the curve shape and also in particular in the phase. All the arrangements according to the invention additionally have in common the fact that on activation of the circuit, the average torque $M_d$, determined over time, is always positive, so that the rotor is set in motion in the correct direction.

With the aid of FIGS. 1 and 2, three arrangements and embodiments, by way of example, of such unjamming arrangements are illustrated. The invention is not restricted to this, however; a rectifier element, for the purpose of unblocking or establishing the operating state (running or standstill), may be connected selectively in parallel or in series to one or more of the components 1,2,3 and 5 described above, in order to achieve the effect illustrated with the aid of FIG. 3.

The application of this unjamming process may take place in various ways, as described in the introduction. An embodiment will be particularly favourably priced, in which the step switch 6 and the switch 9 are combined with each other, so that if required the unjamming phase or the examination of status is initiated by manual switching. Also, the switch 9a, 9b or 9c may be provided with a time element for holding it closed for a short time. Then the arrangement 7a, 7b or 7c can be activated each time the unit is switched on. After switching on, it remains switched on for the time predetermined by the time element. This arrangement would be particularly useful in the case of automatically controlled installations, because then an unjamming of the rotor is provided automatically each time the pump unit is switched on, irrespective of whether it is jammed or not.

Figure 4:
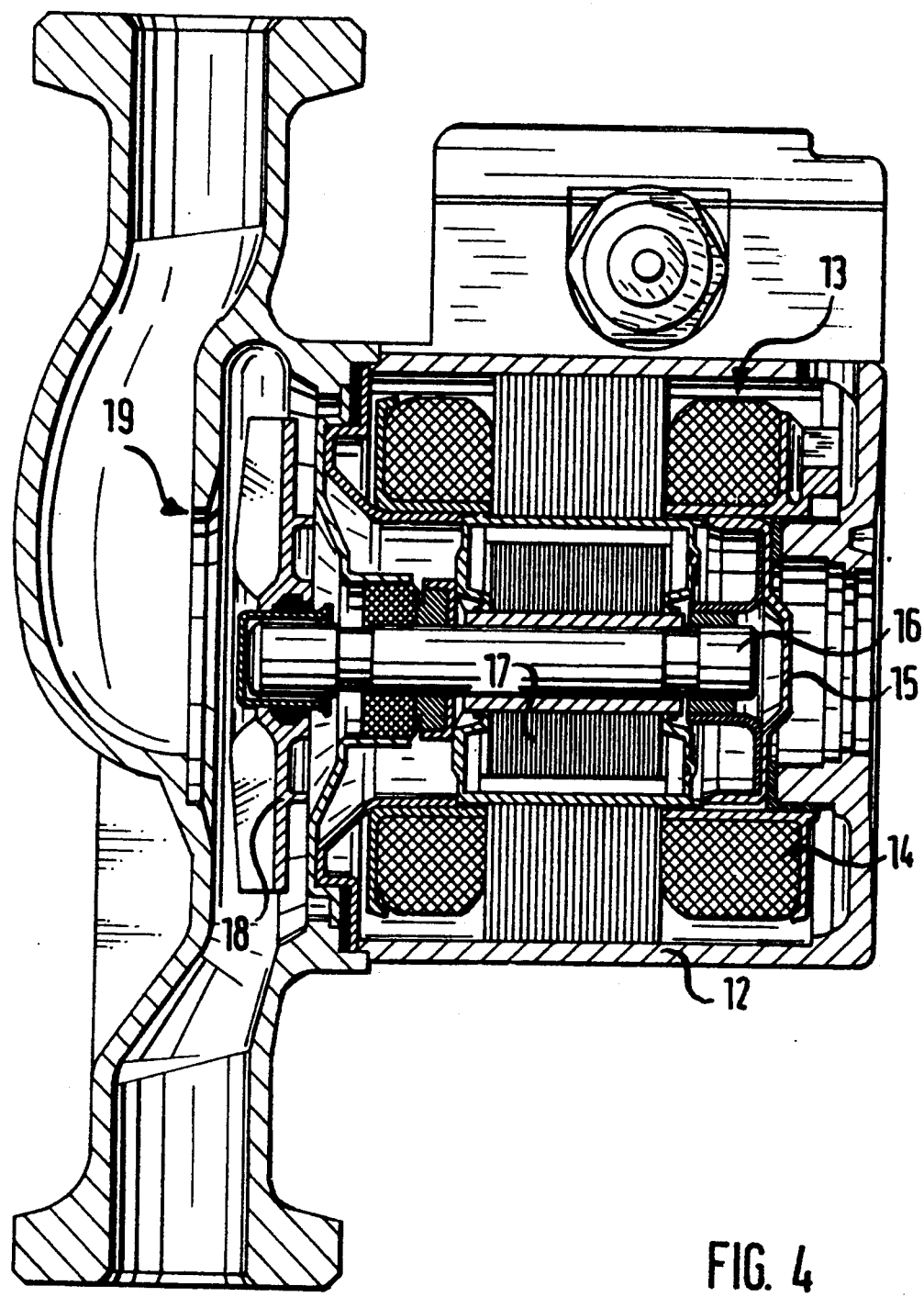
FIG. 4 shows a longitudinal section through a centrifugal pump unit according to the invention.

FIG. 4 shows for example how the pump unit with unjamming arrangement 7 can be embodied structurally.

A single-phase induction motor 13 sits inside a housing 12, the stator winding 14 of which motor is isolated by a split tube casing 15 from the conveyed medium located in the pump chamber. The split tube casing 15 is constructed so as to be closed at its base. A shaft 16 is rotatably mounted in the casing and carries the stator 17 of the motor 13 inside the casing and the impeller 18 of the pump 19 outside the split tube casing 15.

The split tube casing 15 (and also the housing 12 in this region) can be constructed so as to be closed, because the accessibility of the shaft 16 involving dismantling the housing 12 is no longer necessary.

The unjamming arrangements illustrated and described with the aid of the example embodiments described above use a rectifier element. This should be the cheapest solution of such an unjamming arrangement; and could be used in numerous applications. However, the present invention is in no way restricted to such a rectifier element for electrical unjamming. It is only necessary that during the unjamming phase at least a part of the motor winding is acted upon by a voltage which alters over time, the mean value of which, formed during an oscillation period (of the supply voltage) is not equal to zero. There are numerous technical solutions by which this can be achieved.

Figure 5:
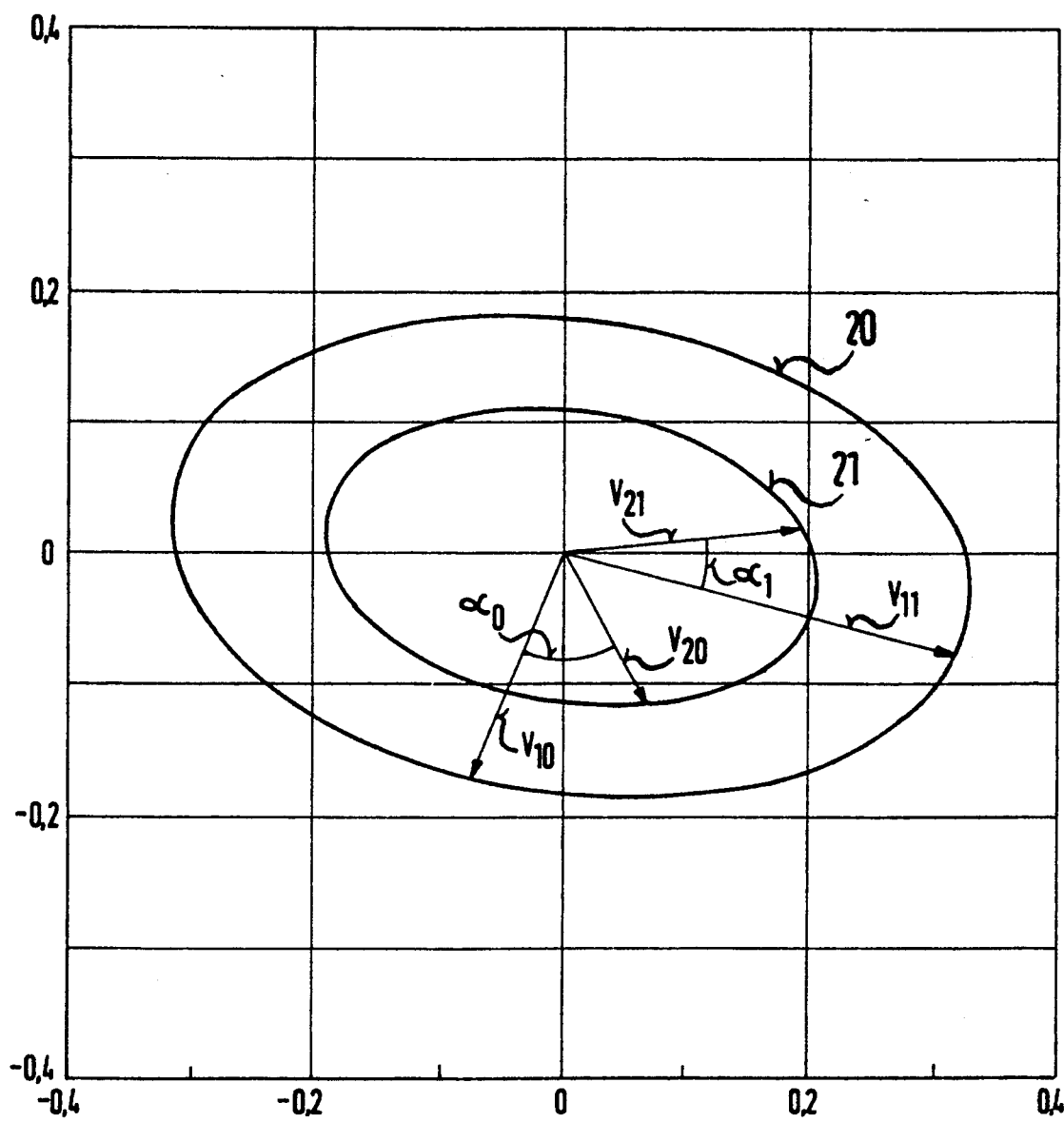

In normal motor operation (also in the starting phase) the mean value of the voltage acting upon the motor is always zero, and a relative magnetic flux is produced inside the motor, as illustrated with the aid of FIG. 5. There, 20 designates the curve of the relative stator flux during a motor revolution and 21 designates that of the relative rotor flux. In the illustration according to FIG. 5, by way of example, a pair of vectors $v_{10}$, $v_{20}$ at an angle of $\alpha_0$ to each other and another pair of vectors $v_{11}$, $v_{21}$ at an angle $\alpha_1$ to each other are illustrated. These vectors according to the turning of the rotor travel from the zero point along the curves 20 or 21 respectively. It can also be seen that these pairs of vectors change both their length and also their direction and their angle with respect to each other during a revolution of the rotor. The following relationship applies approximately for the moment M produced by the motor $$M = \text{const.} \cdot |\vec{v_1}| \cdot |\vec{v_2}| \cdot \sin \alpha = \text{const.} \cdot |\vec{v_1} \times \vec{v_2}|$$

The illustration according to FIG. 5 applies for a single phase induction motor, when the voltages applied to the windings produce the mean value zero (during an oscillation period).

Figure 6:
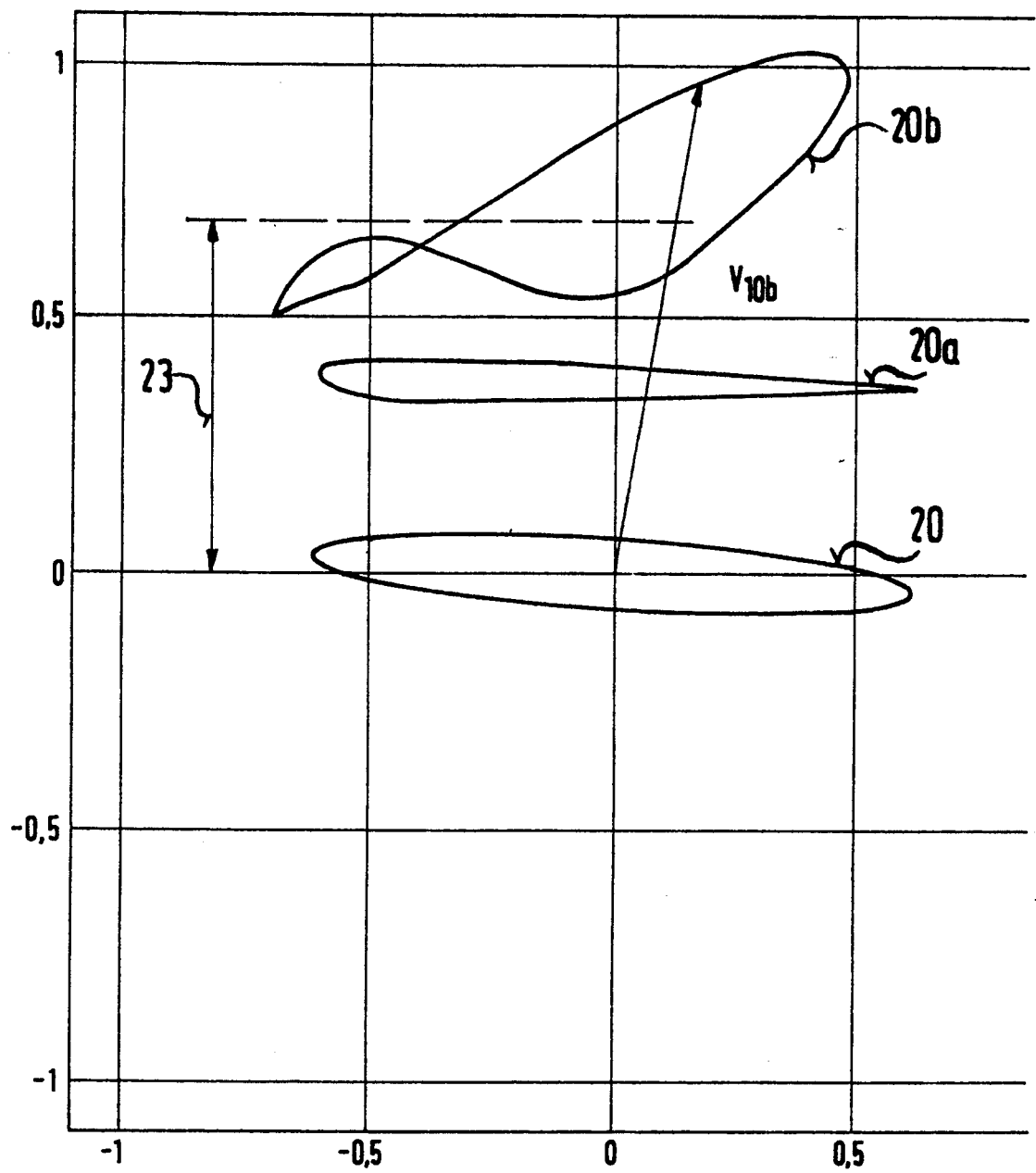

If the voltage on a part of one or more windings is set to a mean value not equal to zero, the previously elliptical form of the curve of the relative magnetic flux alters, as is illustrated by way of example by means of the curves 20a and 20b in FIG. 6. For comparison, in FIG. 6 the curve 20 of the relative magnetic flux of the stator of FIG. 5 is illustrated. For reasons of clarity, the corresponding rotor flux curves have not been illustrated in FIG. 6, however these behave in a very similar manner to the stator flux curves. As FIG. 6 shows, not only does the curve shape alter but the curve also moves away from the zero coordinate point. In the curve 20b, by way of example a vector $v_{10b}$ is drawn. The distance by which the curve 20b moves away from the original curve 20, is indicated by 23 in FIG. 6. This distance 23 is a function of the mean value of the supply voltage $U_m$ supplying the motor.

If a pair of vectors $v_{10}$, $v_{20}$ (as illustrated in FIG. 5) is allowed to travel along the curve 20b in FIG. 6, then it becomes clear that the length of the vectors has become increased twice to three times compared with the original length. From this, there results the increase in torque during the unblocking phase.

In particular the curve 20b in FIG. 6, makes it clear that not only is the torque increased, but the angle $\alpha$ also alters during an oscillation period of the supply voltage. The sign of the angle $\alpha$ also alters because the rotation point of the pair of vectors lies outside the curve. This change in sign is responsible for the vibration effect described above.

We claim:

1. A centrifugal pump unit with a single phase induction motor constructed as a split tube motor, the motor having at least one start winding connected in parallel with a power supply, a condenser connection in series with said at least one start winding, and a power winding connected in parallel with said power supply and said start winding and said condenser comprising:
   a means for altering over time a voltage applied to a winding of the motor wherein the mean value of the voltage during an oscillation of the voltage is not equal to zero; and
   a switch for connecting said voltage altering means to a winding of the motor.

2. A centrifugal pump unit according to claim 1, wherein said voltage altering means comprises a rectifier element connected in series with said power winding and wherein said switch is connected in parallel to said rectifier so that when said switch is open said rectifier suppresses a half wave of the alternating current flowing through the power winding.

3. A centrifugal pump unit according to claim 1, wherein said voltage altering means comprises a rectifier element connected in parallel with said start winding and in parallel with said condenser, and wherein said switch is connected in series with said rectifier, said rectifier and said switch connecting said start winding to said power winding so that when said switch is closed, a half wave of alternating current flowing through the start winding is suppressed.

4. A centrifugal pump unit in accordance with claim 1, wherein said voltage altering means comprises a rectifier element connected in series with said start winding and wherein said switch is connected in series with said rectifier and in parallel with said condenser.

5. A centrifugal pump unit according to claim 1, wherein the motor includes a split tube casing constructed with a closed base.

6. A centrifugal pump unit according to claim 1 wherein the voltage altering means is a rectifier element.

7. A centrifugal pump unit according to claim 6 wherein the rectifier element is a diode.

8. A centrifugal pump unit according to claim 6, wherein the rectifier element is connected with at least one of the windings for a predetermined time concurrently with the switching on of the unit.

9. A centrifugal pump unit according to claim 6, wherein the rectifier element is automatically connected for a predetermined time if the rotor becomes jammed.

10. A centrifugal pump unit according to claim 6, wherein the rectifier element is connectable with at least one of the windings via an external control.

11. A centrifugal pump unit according to claim 1, further comprising a power supply including a controllable frequency changer, wherein the frequency changer is controlled together with the active switching of the rectifier element for the emission of a predetermined frequency for unjamming the rotor.

12. A method for unjamming a rotor of a single phase induction motor of a centrifugal pump unit, wherein the method comprises:
   electrically controlling torque produced by the motor during an unjamming phase to produce a variable torque, wherein the torque direction is changed during the unjamming phase.

13. A method for unjamming a rotor of a single phase induction motor of a centrifugal pump unit, wherein the method comprises:
   electrically controlling torque produced by the motor during an unjamming phase to produce a variable torque, wherein during the unjamming phase, a voltage which alters over time is applied to at least a part of a winding of the motor, the mean value of the voltage during an oscillation period of the voltage, not being equal to zero.

14. A method for unjamming a rotor of a single phase induction motor of a centrifugal pump unit, wherein the method comprises:
   electrically controlling torque produced by the motor during an unjamming phase to produce a variable torque, wherein a half wave of an alternating current which is supplied to at least a part of a motor winding, is eliminated from the supplied current for a predetermined period of time.

* * * * *